July 19, 1949.  L. W. BUCHANAN  2,476,811
SINGLE-PHASE CAPACITOR MOTOR
Filed Nov. 20, 1947
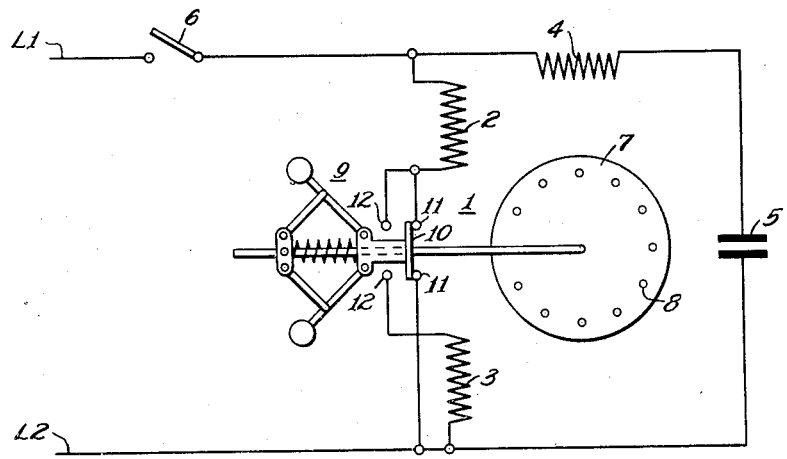
WITNESSES:
Robert C Baird
INVENTOR
Lloyd W. Buchanan.
BY
ATTORNEY Patented July 19, 1949

2,476,811

UNITED STATES PATENT OFFICE 2,476,811

SINGLE-PHASE CAPACITOR MOTOR

Lloyd W. Buchanan, Lima, Ohio, assignor to Westinghouse Electric Corporation, East Pittsburgh, Pa., a corporation of Pennsylvania Application November 20, 1947, Serial No. 787,173

6 Claims. (Cl. 318—225)

The present invention relates to single-phase induction motors of the single-phase capacitor type and, more particularly, to a motor of this type having high starting and pull-out torques.

Single-phase induction motors of the single-value, or permanent-split, capacitor type have a main primary winding and an ouxiliary, or capacitor, primary winding which are physically displaced from each other on the primary member or stator of the motor, usually by 90 electrical degrees. A capacitor is connected in series with the auxiliary winding so that the currents in the two primary windings differ in phase, and the auxiliary winding remains permanently connected in parallel with the main winding during operation of the motor, and is not disconnected after starting, as in some other types of single-phase motors.

Since the auxiliary winding and capacitor in this type of motor are permanently connected to the line and are continuously energized during operation of the motor, the auxiliary winding must be designed to carry current continuously, and the auxiliary winding and capacitor must be designed for the most efficient operation under normal running conditions. This results in low starting torque, however, as the value of capacitance required for high starting torque would be too great for efficient or satisfactory operation under normal running conditions. Where high starting torque is required, it has been necessary to utilize the two-value type of capacitor motor, in which an additional starting capacitor is connected in parallel with the running capacitor during starting of the motor only, or in which the voltage applied to the capacitor is increased during starting in order to increase the effective capacitance in the circuit. These expedients increase the cost of the motor, however, because of the requirement of an additional capacitor or of an auto-transformer. It would be very desirable, therefore, to provide a motor of the single-value capacitor type in which high starting torque can be obtained without substantially increasing the cost of the motor.

There are also many applications for single-phase motors for which the single-value capacitor type of motor is well suited but in which high peak loads are encountered for short periods, and in these applications the motor must have high enough pull-out torque to carry the peak loads. For such applications it has been necessary heretofore to use a larger motor than would be required for the normal load in order to provide sufficient torque to carry the peak loads.

In such cases, a considerable saving could be effected if the pull-out torque of the motor could be temporarily increased during peak load periods, since a smaller motor could then be used.

The principal object of the present invention is to provide a single-phase induction motor of the single-value capacitor type in which relatively high starting torque is obtained, as compared to the starting torque of conventional motors of this type, but without substantially increasing the cost of the motor.

Another object of the invention is to provide a single-phase induction motor of the single-value capacitor type in which the pull-out torque is increased when the motor is slowed down by a peak load, so that the motor is capable of carrying high peak loads for short periods.

More specifically, the object of the invention is to provide a single-phase induction motor of the single-value capacitor type in which the ratio of the effective turns of the auxiliary primary winding to the effective turns of the main primary winding is altered at starting, or when the motor is slowed down by a peak load, in order to increase the starting torque and pull-out torque. This result is preferably obtained by means of a simple and inexpensive speed-responsive switch, so that the increased torques are obtainable without substantially increasing the cost of the motor.

Other objects and advantages of the invention will be apparent from the following detailed description, taken in connection with the accompanying drawing, the single figure of which is a schematic diagram showing a preferred embodiment of the invention.

The drawing shows the invention embodied in a single-phase induction motor having a main primary winding 1 which consists of two separately wound sections 2 and 3, on the primary member or stator of the motor. The two sections 2 and 3 of the main winding 1 are preferably both wound in all the poles of the winding, although any suitable winding arrangement might be utilized. An auxiliary, or capacitor, primary winding 4 is also provided on the stator of the motor and is physically displaced from the main winding 1, preferably by 90 electrical degrees. A capacitor 5 is connected in series with the auxiliary winding 4. The main primary winding 1 and auxiliary primary winding 4 are connected to a single-phase supply line L1, L2 by means of a line switch 6, and both windings are connected to the line at all times during operation. The motor also has a rotor member 7 which carries a suitable secondary winding, shown as a squirrel-cage winding 8.

The two sections 2 and 3 of the main winding 1 are controlled by any suitable speed-responsive switching arrangement, shown diagrammatically as a centrifugal switch 9 which may be of any suitable type. The switch 9 has a movable contact 10 which bridges fixed starting contacts 11 when the motor is at rest or running at low speed, and which bridges fixed running contacts 12 when the speed of the motor exceeds the predetermined speed for which the switch 9 is adjusted. The starting contacts 11 of the switch are connected between one end of the main winding section 2 and the line L2, while the running contacts 12 are connected between the same end of the winding section 2 and one end of the winding section 3. The other ends of the winding sections 2 and 3 are connected to the line L1 and the line L2, respectively. It will be seen from the drawing, that when the switch is in its low-speed or starting position shown in the drawing, the winding section 2 alone is connected across the line in parallel with the auxiliary winding 4 and capacitor 5. When the switch 9 moves to its running position, as the motor speeds up, with the contact 10 bridging the running contacts 12, both winding sections 2 and 3 are connected in series across the line in parallel with the auxiliary winding 4 and capacitor 5.

The starting torque of a single-value capacitor motor is determined by a number of factors, which are fixed in the design of the motor. In a given motor arranged as described above, most of these factors are substantially unchanged when the switch 9 moves from starting position to running position. In addition to the factors which are constant in a given motor, however, the starting torque is also proportional to the main winding locked-rotor current, the rotor resistance referred to the main winding, and the ratio of the effective number of turns in the auxiliary winding to the effective number of turns in the main winding. Both the main winding locked-rotor current and the value of rotor resistance referred to the main winding change when the switch 9 moves from starting to running position, since both depend on the number of turns of the main winding in circuit, but these changes are in opposite directions, so that the changes in these two quantities substantially compensate each other and do not affect the starting torque. The ratio of auxiliary winding turns to main winding turns, however, is greater when the switch is in the starting position, since only one section of the main winding is in circuit. Thus, when the switch 9 is in its starting position, the torque is increased, as compared to the torque on the running connection, because of the higher ratio of effective turns in the auxiliary winding to effective turns in the main winding. It will be apparent that the increase in starting torque caused by cutting out one section of the main winding at starting is substantially proportional to the ratio of the sum of the turns in both main winding sections to the number of turns in section 2.

Since the increase in torque is determined by the relation of the number of turns in the two sections 2 and 3 of the main winding 1, it will be apparent that any desired increase in torque may be obtained by selecting the proper ratio between the number of turns in the two sections, the permissible value of this ratio being limited by the voltage on the capacitor 5 at the switch operating speed, and by the maximum allowable starting current. In many cases, it is preferable to make the number of turns the same in both sections 2 and 3, since this results in the lowest cost for the winding.

A further increase in starting torque may be obtained by using different sizes of wire in the two main winding sections. Thus, for example, if both sections have the same number of turns, section 2 may be wound with wire one size larger than would be used in a conventional motor, and section 3 may be wound with wire one size smaller than would be used in a conventional motor. The total resistance of the two sections in series would then be substantially the same as in the conventional motor and the operation under normal running conditions would be the same, but the starting torque would be increased even more than described above, because of the lower resistance of the winding section 2 and the resulting increased current when this section alone is connected to the line in starting. Thus, by suitably choosing the numbers of turns in the two main winding sections and the sizes of wire used for the winding sections, a large increase in starting torque may be obtained, and it may be made as large as desired or necessary, within the limits mentioned above of allowable capacitor voltage and maximum permissible starting current.

After the motor has started and while its speed is still below the speed at which the speed-responsive switch 9 operates, the torque will be greater than the starting torque and considerably greater than the torque of a motor of conventional design, because the effect of using fewer effective turns in the main winding 1 increases the single-phase torque, as explained above, and the increased ratio of auxiliary winding effective turns to main winding effective turns results in increased voltage applied to the capacitor 5, thus giving the effect of greater capacitance in the circuit, which also increases the torque. This increase in voltage on the capacitor at this stage of the motor operation is permissible, since the capacitor voltage is normally lower in this period than at normal speed and load, and since the increased voltage is applied only for a short time, it has no adverse effect on the life of the capacitor.

Thus, when the motor is operating at low speed, below the operating speed of the switch 9, the torque is greatly increased by the omission of one section of the main winding from the circuit. This effect permits the motor to carry relatively high peak loads, since, when such a peak load occurs while the motor is running at normal speed, the motor will slow down until the switch 9 operates and returns to the starting connection. The increased torque then permits the motor to carry the peak load and as soon as it has dropped, the motor speeds up and the switch 9 returns to the running position, and the motor continues to operate under the normal load in the usual manner. This peak load operation, of course, increases the losses, but since it normally occurs only for short periods, this is unimportant. Thus the invention makes it possible to use a motor suitable for carrying the normal load, and, in effect, provides a temporarily increased pull-out torque during peak load periods, so that for applications in which such loads occur it is not necessary to use a larger motor than is needed for the normal load, as has previously been necessary.

It should now be apparent that a single-phase motor of the single-value capacitor type has been provided in which greatly increased torque is obtainable, as compared to the torque of conventional motors of this type. The main winding I may be primarily designed either for high starting torque or for high pull-out torque, depending on the particular application for which the motor is to be used. It will be apparent that various modifications may be made within the scope of the invention, and it is to be understood that, although a specific embodiment has been shown and described for the purpose of illustration, the invention is not limited to this specific arrangement, but in its broadcast aspects it includes all equivalent embodiments and modifications which come within the scope of the appended claims.

I claim as my invention:

1. A single-phase induction motor having a main primary winding, said main primary winding comprising two sections, a physically displaced auxiliary primary winding, a capacitor connected in series with said auxiliary primary winding, and means for connecting one section of the main primary winding to a single-phase supply line in parallel with the auxiliary primary winding when the motor is below a predetermined speed and for connecting the auxiliary primary winding and both sections of the main primary winding in series to the supply line when the motor is above said speed.

2. A single-phase induction motor having a main primary winding, said main primary winding comprising two sections, a physically displaced auxiliary primary winding, a capacitor connected in series with said auxiliary primary winding, and speed-responsive switch means for connecting one section of the main primary winding to a single-phase supply line in parallel with the auxiliary primary winding when the motor is below a predetermined speed and for connecting the auxiliary primary winding and both sections of the main primary winding in series to the supply line when the motor is above said speed.

3. A single-phase induction motor as defined in claim 2 in which the two sections of the main primary winding have the same number of turns.

4. A single-phase induction motor as defined in claim 2 in which the two sections of the main primary winding have the same number of turns and in which the first-mentioned section is wound with wire of a larger size than the last-mentioned section.

5. A single-phase induction motor having a stator member and a rotor member, a main primary winding and an auxiliary primary winding on the stator member, a secondary winding on the rotor member, a capacitor connected in series with said auxiliary primary winding, said main primary winding comprising two sections, and means for connecting the main and auxiliary primary windings in parallel to a single-phase supply line, said connecting means including means for connecting one section only of the main primary winding to the line when the motor is below a predetermined speed and for connecting both sections of the main primary winding in series to the line when the motor is above said speed.

6. A single-phase induction motor having a stator member and a rotor member, a main primary winding and an auxiliary primary winding on the stator member, a secondary winding on the rotor member, a capacitor connected in series with said auxiliary primary winding, said main primary winding comprising two sections, and means for connecting the main and auxiliary primary windings in parallel to a single-phase supply line, said connecting means including a speed-responsive switch having a starting position and a running position, said switch being connected to the sections of the main primary winding in such a manner that one section only of the main primary winding is connected to the line when the switch is in starting position and that both sections of the main primary winding are connected to the line in series when the switch is in running position.

LLOYD W. BUCHANAN.

REFERENCES CITED

The following references are of record in the file of this patent:

UNITED STATES PATENTS

| Number | Name | Date |
|---|---|---|
| 1,484,046 | Wellington | Feb. 19, 1924 |